United States Patent
Oki

(10) Patent No.: US 7,252,440 B2
(45) Date of Patent: Aug. 7, 2007

(54) OPTICAL TRANSCEIVER WITH OPTICAL SUB-MODULE THERMALLY COUPLES WITH OPTICAL TRANSCEIVER WITHOUT MECHANICAL STRESS

(75) Inventor: Kazushige Oki, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/289,593

(22) Filed: Nov. 30, 2005

(65) Prior Publication Data

US 2006/0140554 A1    Jun. 29, 2006

Related U.S. Application Data

(60) Provisional application No. 60/631,885, filed on Dec. 1, 2004.

(51) Int. Cl.
    *G02B 6/36* (2006.01)
(52) U.S. Cl. .......................................... 385/92
(58) Field of Classification Search ............ 385/88–94
    See application file for complete search history.

(56) References Cited

U.S. PATENT DOCUMENTS

| 5,943,461 | A | 8/1999 | Shahid |
| 6,522,486 | B2 | 2/2003 | Furuhashi et al. |
| 6,676,306 | B2 * | 1/2004 | Ikeda et al. ................... 385/92 |
| 2004/0252953 | A1 * | 12/2004 | Crane et al. .................. 385/92 |

* cited by examiner

*Primary Examiner*—Sarah Song
(74) *Attorney, Agent, or Firm*—Venable LLP; Michael A. Sartori; Steven J. Schwarz

(57) ABSTRACT

An optical module free from the mechanical stress and used in an optical transceiver is disclosed, even the position of the module is fixed with respect to the housing not only from the viewpoint of the optical alignment but also the heat conduction. The optical module comprises the sleeve portion and the box portion. The sleeve portion is directly fixed to the housing, but the box portion is indirectly fixed to the housing via the support member. Between the box portion and the support member is filled with the thermal grease in one end thereof, while the other end is pressed by the elastic member that presses the box portion against the support member. The box portion is free from the mechanical stress when the sleeve portion is rigidly fixed to the housing.

13 Claims, 8 Drawing Sheets

FIG. 5A
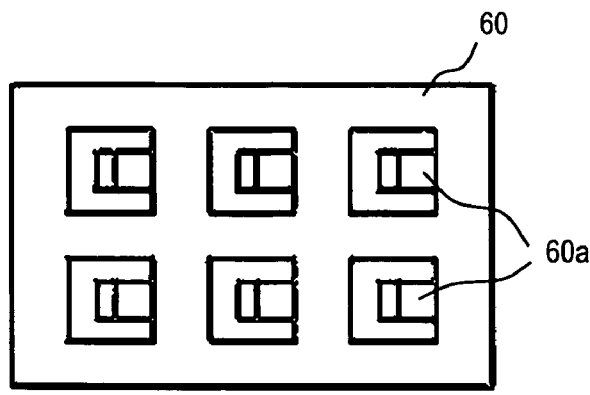
FIG. 5C
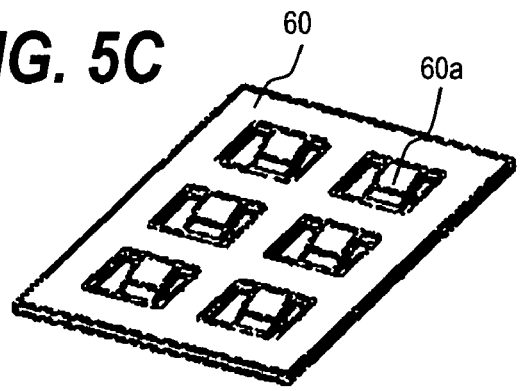
FIG. 5B

OPTICAL TRANSCEIVER WITH OPTICAL SUB-MODULE THERMALLY COUPLES WITH OPTICAL TRANSCEIVER WITHOUT MECHANICAL STRESS

CROSS REFERENCE TO RELATED APPLICATION

This application claims a benefit of a previous application, Ser. No. of 60/631,885, filed on Dec. 1, 2004.

BACKGROUND OF THE INVENTION

1. Field of the Invention

The present invention relates to a structure of an optical transceiver, in which an optical sub-module is fixed to the transceiver without mechanical stress.

2. Related Prior Art

The United States Patent, U.S. Pat. No. 5,943,461, has disclosed an optical transceiver installing optical modules with the pig-tailed type structure for the optical transmission and the optical reception. Optical connectors provided in the end of the pig-tail fiber pulled out from each optical module are set to the housing. A multi-source agreement for such multifunctional optical transceiver has been ruled in the field and published as the X2 standard (X2-MSA). This standard rules the transmission speed of 10 GHz, the pin-assign for the electronic specification, while for the mechanical specification, the dimensions of the housing, the type of the optical and the electrical connectors, and the installing condition of the transceiver with respect to the host system are ruled.

To realize the transmission speed of 10 GHz or higher, a particular electronic circuit used therein is necessary. Especially, the power consumption of devices far increases compared with the case that the transmission speed is 1 GHz or less. Moreover, since the multifunction characteristic in the optical transmission is also required in such high performance transceiver, the optical coupling with the optical fiber is necessary to be further accurate. The optical transceiver is requested to satisfy not only the accurate thermal coupling between members for the increasing power consumption to conduct heat generated by devices but also the accurate optical coupling with respect to the optical fiber.

In the conventional optical transceiver, two subjects, the accurate thermal coupling and the accurate optical coupling, have been antithetical. When the assembly of the optical transceiver is carried out by taking the thermal coupling primarily into consideration, the accurate optical coupling may be not always obtained. Rather, the coupling characteristic inferior to the optimal one is often encountered. Contrary, when the optical coupling is the first priority, the heat dissipation is rarely achieved with acceptable efficiency. The present invention relates to a novel structure to solve the contrary subjects, the accurate optical coupling and the accurate thermal coupling between the optical sub-module and the housing, in particular, a structure for installing the optical transmitting module within the housing, which has a severe thermal condition compared to the optical receiving module.

SUMMARY OF THE INVENTION

An optical transceiver according to the present invention includes an optical transmitting module, a support member, and a housing. The optical transmitting module includes a sleeve portion and a box portion. The sleeve portion is rigidly fixed to the housing from the viewpoint of the optical coupling, while the box portion is indirectly fixed to the housing via the support member.

Since the box portion is adhered to the support member with a thermal grease therebetween and free in positional with respect to directions parallel to the primary surface of the housing, and the supporting member is adhered to the housing with adjustable in a position vertical to the primary surface of the housing. Therefore, the present optical transceiver can make it consistent to optically couple the transmitting module with the housing in accurate and to thermally couple the transmitting module with the housing.

BRIEF DESCRIPTION OF DRAWINGS

FIG. 5A is a plan view, FIG. 5B is a side view, and FIG. 5C is a perspective view of the elastic member according to the present invention;

DESCRIPTION OF PREFERRED EMBODIMENTS

Figure 1:
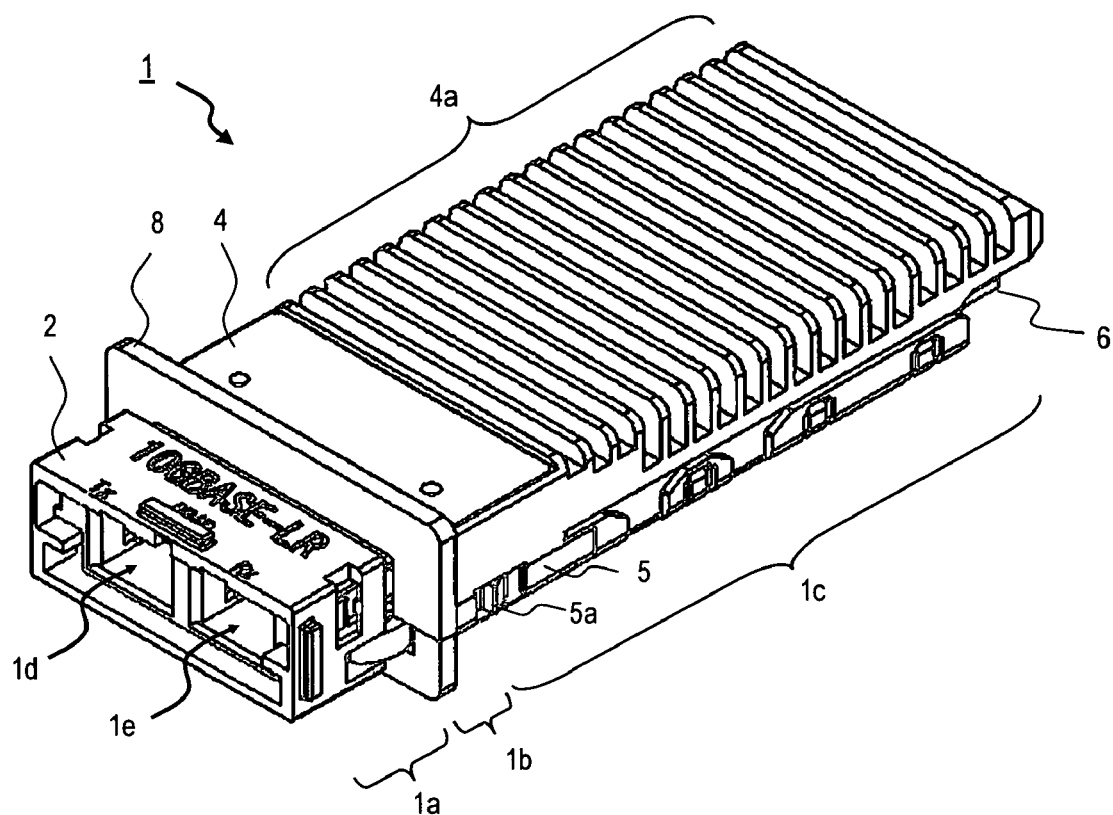
FIG. 1 is a perspective appearance of the optical transceiver according to the present invention.

FIG. 1 is a perspective view of the optical transceiver 1 according to the present invention. The transceiver 1 roughly comprises a receptacle portion 1a, a flange portion 1b, and a circuit portion 1c. The receptacle portion 1a provides two openings, 1d and 1e, corresponding to a transmitting receptacle 1d and a receiving receptacle 1e, respectively. The transceiver 1 also provides a grip 2 surrounding these openings. By sliding the grip 2 frontward and rearward, the transceiver can be released from the host system on which the transceiver 1 is installed.

The flange portion 1b has a flange 8. When the transceiver 1 is installed on the host system, the front side of this flange 8 extrudes from the face panel of the host system to expose the openings, 1d and 1e, to make it possible that the optical connector can be engaged with the openings from the front of the host system. Behind the flange 8 is formed with the circuit portion 1c. The circuit portion 1c installs the substrate 6 on which an electronic circuit is mounted. The electronic circuit is coupled with an optical transmitting module and an optical receiving module installed in the front end of the substrate such that the tip thereof extrudes into respective openings, 1d and 1e. The substrate 6 and two optical modules are assembled with the upper housing 4. Moreover, for the optical modules, they are installed in the transceiver 1 such that the lower housing 5, which is assembled with the upper housing 4, sandwiches these modules therebetween. A latch pin 5a extrudes from the side of the lower housing 5 to secure the engagement of this transceiver 1 with the host system. By sliding the grip frontward and rearward, this latch pin 5a may be pushed out and pulled into such that the transceiver can be latched with and released from the host system.

As the operational speed of the optical transceiver exceeds 1 GHz, the semiconductor laser (LD) installed within the transceiver can not be driven by putting on and shutting off the current provided thereto, which is the so-called direct modulation. Although the electrical signal with such high operational speed may be supplied to the LD with enough quality, the optical output from the LD can not follow the electrical signal such that the optical output power reduces when the current is supplied, i.e., the LD is put on, while increases the output power when the current is decreased, i.e., the LD is shut off. That is, the extinction ratio of the LD degrades at high frequencies.

Figure 2A:
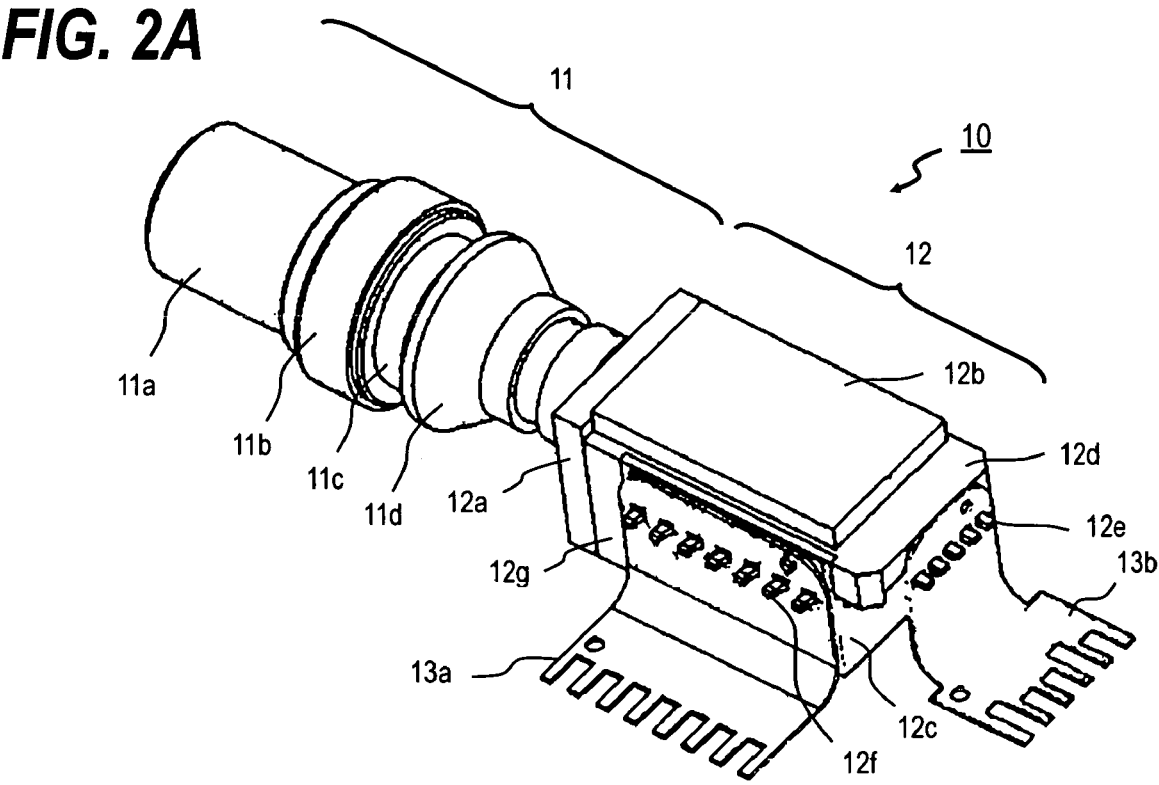
FIG. 2A is a perspective view of the optical transmitting module of the present invention.
Figure 2B:
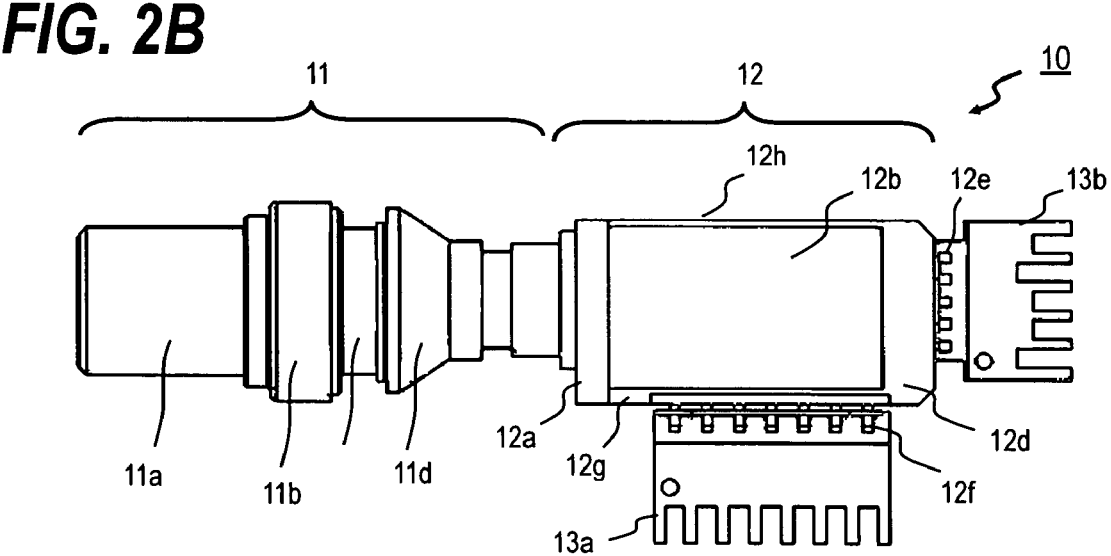
FIG. 2B is a plan view of the optical transmitting module.

It is known, that as one of solution to solve the subject above mentioned, that the LD is driven by a direct current (DC) signal and the static optical output from the LD is modulated at the external of the LD, which is the so-called external modulation. Various external modulators are well known, such as waveguide with the Mach-Zender type and semiconductor using the electro-absorption (EA) effect. FIGS. 2A and 2B show an optical transmitting module 10 that installs a distributed feedback LD (DFB-LD), which shows a excellent monochromatic performance in its optical output, as a light emitting device and an EA modulator for modulating monochromatic light output from the DFB-LD. FIG. 2A is a perspective view of the module, while, FIG. 2B is a side view thereof.

This EA-DFB module 10 roughly comprises a box portion 12 and a sleeve portion 11 extending forward from one side 12a of the box portion 12. Here, the forward direction, or the backward direction, merely refers to a direction to which the sleeve extends and may not distinguish from the function of the module 10. The box portion 12, a size of which is about 10×5.7×5.7 mm3, a side 12a from which the sleeve extends and another side wall 12c in the backward. This side 12c, a pair of sides, 12g and 12h, and an upper surface 12a in FIG. 2A are integrally formed from a ceramics, while the front side wall 12a is made of metal such as Kovar™. Although not shown in FIG. 2A, the upper surface 12d has an opening covered by the ceiling 12b to seal a cavity formed by the sides, 12a, 12c, 12g, and 12h, in airtight. A plurality of lead pins, 12e and 12f, extrudes from the sides, 12c and 12g, respectively.

Within the cavity of the box portion 12 is installed with the EA-DFB device and a thermo-electric controller (TEC), typically the Peltier device, to control the temperature of the DFB-LD such that the TEC is in directly contact to the inside of the ceiling 12b and the DFB-LD is mounted on the TEC. The ceiling 12b is made of material with good thermal conductivity, and CuW may be applicable for the ceiling 12b. The upper surface 12d may mount the driver for driving the EA portion of the EA-DFB device with high frequencies. The lead pins 12e in the back side 12c transmit high frequency signals to the driver within the cavity, while other lead pins 12f in the side 12g provide the power to the driver, the EA-DFB device and the TEC device, which is a direct current (DC) or comparably low frequency signal. In the present module shown in FIGS. 2A and 2B, these signals including driving-signal with high frequencies and power supply signal with a DC or comparably low frequencies are fed via flexible printed circuit (FPC) boards, 13a and 13b.

As mentioned previously, the recent optical communication requests the transmission speed higher. Optical transceivers with a transmission speed of 2.5 GHz have been commercially obtained since a few years ago, and the speed is going to exceed 10 GHz now. Thus, as the operation speed increases, the power consumption by devices installed within the box portion 12 also considerably increases. The present module 10 shown in FIG. 2 consumes the power by the driver and the TEC device in the box portion reaches 1 W. Therefore, the heat dissipation of the box portion is necessary to be considered.

The sleeve portion 11, extending from the side 12a of the box portion 12, comprises a plurality of cylindrical members, 11b to 11d. The front end thereof forms a metal sleeve 11a that receives the ferrule securing the optical fiber in a center thereof. The cylindrical members, 11b to 11d, align the sleeve 11a in optical with respect to the EA-DFB device installed in the box portion 12. The light emitted from the EA-DFB device is necessary to be concentrated on the tip of the fiber inserted within the sleeve 11a. These cylindrical members performs the optical alignment in three directions, i.e., along to the optical axis Z and within a XY-plane intersecting the optical axis. After the alignment, these cylindrical members are permanently fixed to each other with, for example, the YAG laser welding.

Figure 3:
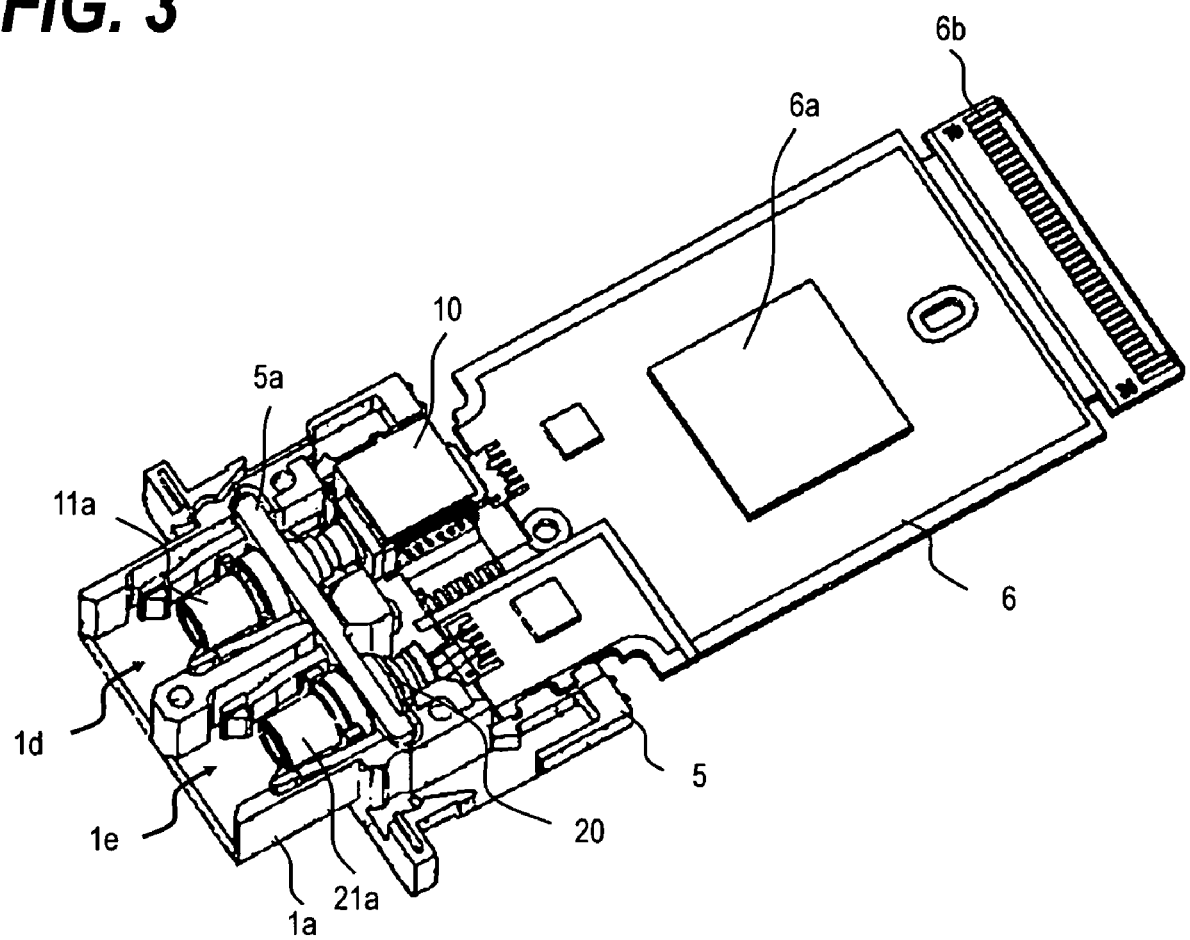
FIG. 3 is a view shown the transmitting optical module, the receiving optical subassembly, and the substrate are assembled with the lower housing.

FIG. 3 shows the EA-DFB module 10 installed witin the lower housing 5 of the optical transceiver 1. The transceiver 1 includes the receptacle portion 1a, the EA-DFB module 10, a receiving optical sub-assembly (ROSA) 20, and the substrate mounting the electronic circuit. Two openings, 1d and 1e, of the receptacle portion 1a receive the optical connector, while the sleeve 11a of the EA-DFB module 10 and that 21a of the ROSA 20 extrude within the openings, 1d and 1e, respectivele to optically couple there with the ferrule accompanied with the optical connector. Although the present embodiment provides the lower housing 5 made of die-casted metal, a resin made housing may be applicable. Moreover, the ROSA 20 in the present invention has a so-called co-axial shape wihtouh any box-shaped portion. The ROSA may provide a box portion within which the TEC device is installed therein.

The electronic cirucit mounted on the substrate 6 is a driver for driving the EA-DFB device or a signal processor for processing a signal output from the ROSA 20, which is converted into an electronic form by a light-receiving device installed witin the ROSA. In FIG. 3, these circuits are integrated in the single IC 6a. In the rear end of the substrate 6 is formed with an electronic plug 6b to transmit the signal and the electronic power to the host system.

The EA-DFB module 10 and the ROSA 20 are mounted on the lower housing 5 and, at the same time, are fixed their position with respect to the lower housing 5 by cramping the sleeves, 11a and 21a, with the latch bar 5b. The sleeve portion 11, in particular the necked portion 11c thereof, is cramped and fixed to the lower housing 5 by the latch bar 5b. On the other hand, the front side 12a extrudes the sleeve portion 11, the rear side 12c and the side 12g extend the FPC board therefrom, respectivel, accordingly, these sides, 12a, 12c, and 12g, can not come in directly contact to any other members to improve the efficinecy of the heat dissipation. To dissipate the heat generated within the box portion in effective is necessary to ustilize the rest side 12h, or the upper 12b and bottom surfaces.

Accordingly, the side 12h or the upper surface 12b is required to come in directly contact to members, for example, the inside surface of the transceiver 1, for example, the lower housing 5. On the other hand, the halfway 11c of the sleeve portion 11 is also fixed to the lower housing 5. That is, the EA-DFB module 10 is necessary to be fixed to the housing 1 at the sleeve portion 11 and the box portion 12. When it is accurately secured that the physical dimension of the EA-DFB module 10 and a portion of the lower housing 5 for installing the EA-DFB module, any problem will cause in the transceiver 1. However, when the physical dimension is not enough secured and the sleeve portion 11 is aligned with the optical receptacle primarily for the optical coupling, a gap is occasionaly caused between the box portion 12 and the housing 5. To fill this gap in mechanical by pressing the box portion 12 against the inner surface of the transceiver caseses not only the degradation of the optical coupling efficiency between the sleeve portion 11 and the optical fiber but the reliability of the module 10 due to the mechanically stress induced in the attached poitn of the sleeve portion 11 to the box portion 12.

Figure 4A:
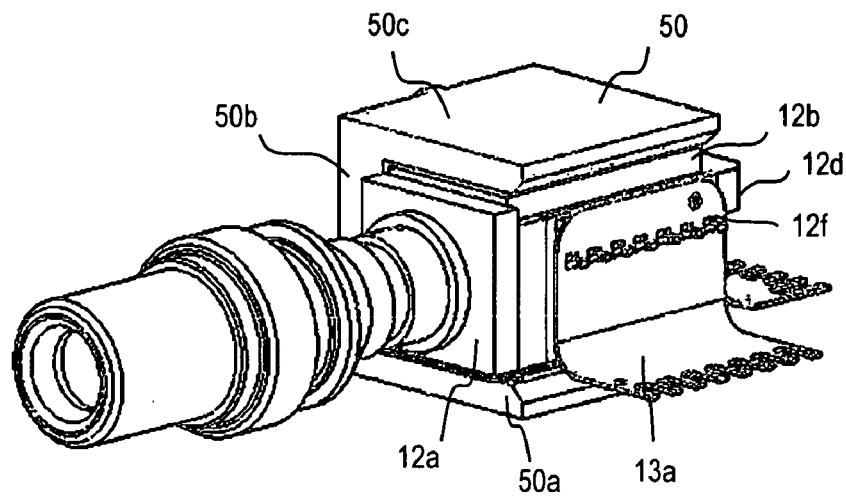
FIG. 4A shows the transmitting optical module of the present invention assembled with the support member.
Figure 4B:
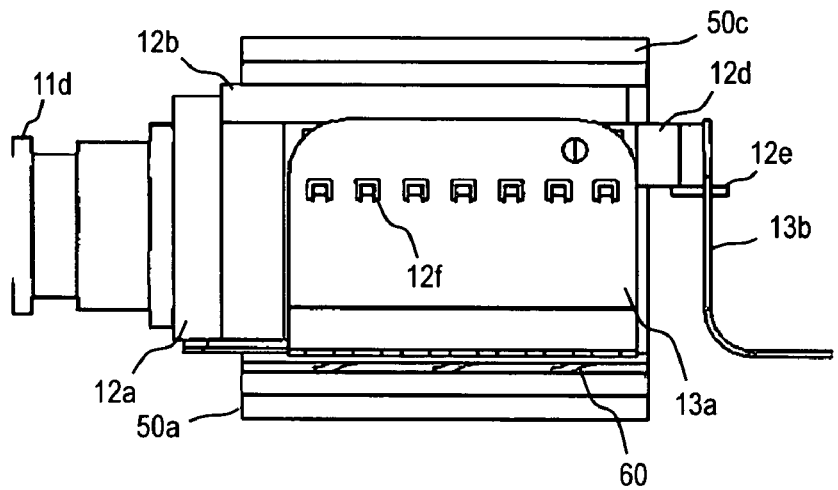
FIG. 4B is the side view of the assembly of the optical transmitting module with the support member.

FIGS. 4A and 4B show an appearance of the support member 50 according to the present invention, which is attached to the EA-DFB module 10. The support member 50 itself is illustrated in FIG. 6. The support member 50 is made of metal with good thermal conductivity such as aluminum (Al). The member 50 has an U-shape that surrounds the side 12h, and the top 12b and bottom surfaces of the EA-DFB module 10. These surfaces, as previously explained, have no sturucures and elements and are prepared to be in contact to other members. Between the top surace 12b and the top portion 50c of the support member 50 facing the top surface 12b is filled with a thermal grease to enhance the heat conduction therebetween. As explained in FIG. 2A, the TEC is the component to generate the largest heat within the box portion 12, and is installed so as to be in directly contact to the ceiling 12b. Accordingly, by coming the ceiling 12b in contact to the top portion 50c of the support member 50 with the thermal grease therebetween, the heat genrated in the box portion 12, in particular, the heat generated by the TEC device may be effectively dissipated to the support member 50.

Between the bottom of the module 10 and the portion 50a of the support member 50 is inserted with a elastic member 60, which pressens the EA-DFB module 10 against the upper portion 50c of the support member 50. Since the ceiling 12b of the module 10 put the thermal grease between the upper portion 50c, the thermal coupling there between may be enhanced. For the position of the module 10 relative to the support member 50 in horizontal, the support member 50, and the module 10, brings no restriction in the present arrangement. That is, a gap may be induced between the side portion 50b of the supprt member and the side 12h of the module 10.

Figure 4C:
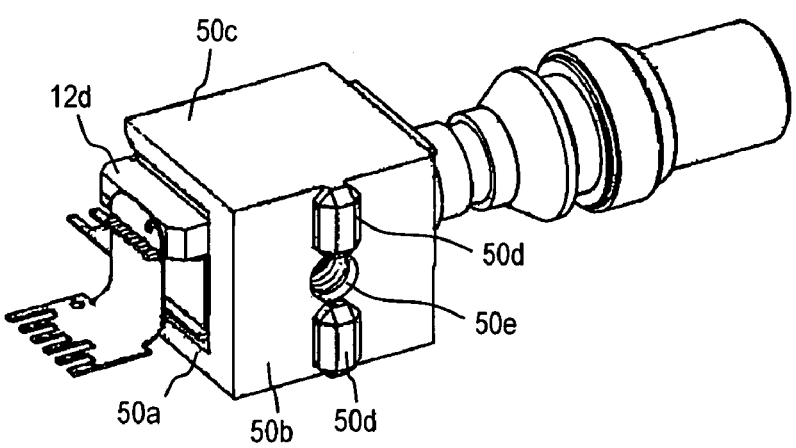
FIG. 4C is the assembly viewed from a side opposite to FIG. 4A.

FIG. 4C shows the module 10 with the support membet 50 from a dirrection opposite to that in FIG. 4A. The support member 50 fomrs a pair of projections 50d, arrannged in up and down at a substantially center of the side portion 50b, and an screw hole 50e between the projections 50d. The function of the screw hold 50e will be illustrated later.

FIGS. from 5A to 5C illustrate an example of the elastic member 60. In this embodiment, the elastic member is made of metal plate with a plurality of punched hole, a spring piece 60a extneding into the puched hole from the edge thereof. The spring piece in respective punched holes is bent downward to show the elasicitiy. When this elastic member 60 is inserted between the module 10 and the support member 50, the elastic member 60 presses the module 10 agains the support membet by the elastic force of these spring pieces 60a. A sum of the bent amount of the spring piece, a thickness of the elastic member 60, and the total height of the box portion 12 is greater than an inner distance beween the top 50c and bottom portions 50a of the support member 50. At the same time, the thickness of the elastic member 60 and the total height of the box portion 12 in a sum is necessry to be samller than the inner distance between the top 50c and bottom 50a portions of the supprt member to press the module 10 against the bottom portion 50c. Moreover, in addition to the thermal grease filled between the ceiling 12b and the top portion 50c of the support member 50, it is further effective for the heat dissiaption to apply a thermal grease on the side of the module 10 where the elastic member is inserted.

Figure 6A:
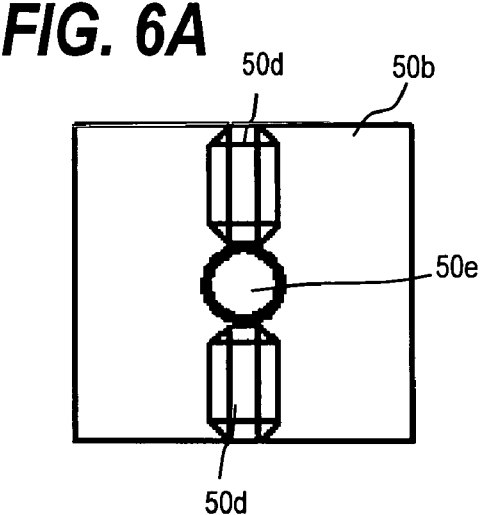
FIG. 6A is a side view.
Figure 6B:
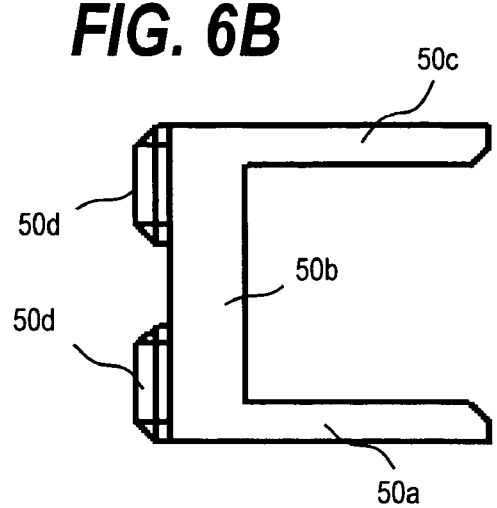
FIG. 6B is a front view.
Figure 6C:
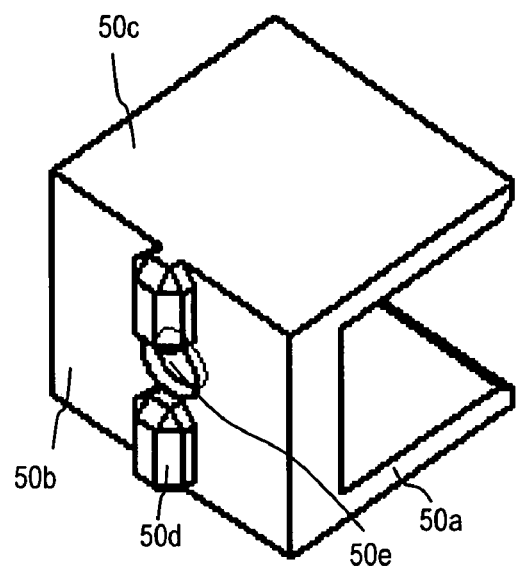
FIGS. 6C and 6D are perspective views of the support member according to the present invention.
Figure 6D:
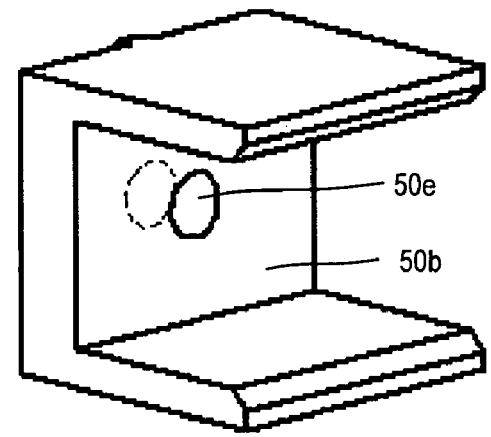

FIGS. from 6A to 6D show the support member 50 viewed from various direction. FIG. 6A is the side view, FIG. 6B is the front view, and FIGS. 6C and 6D are perspective views. The support member 50, as previously explained, is made of material with good thermal conductivity, for instance, aluminum (Al), with the U-shaped configuration opening the front and rear end. The upper portion 50c thereof comes in contact to the ceiling 12b of the module 10 via the thermal grease, while, the bottom portion 50a thereof is pressed by the elasitic member 60 put between the bottom of the module 10. On the side 50b of the member 50 forms a pair of proejections 50d extending in up and down with the screw hole 50e therebetween, into which a screw to fix the support member 50 to the upper housing 4 of the transceiver. The projections 50 are fit into the groove 4c formed in the innser side surface of the upper housing 4.

Figure 7A:
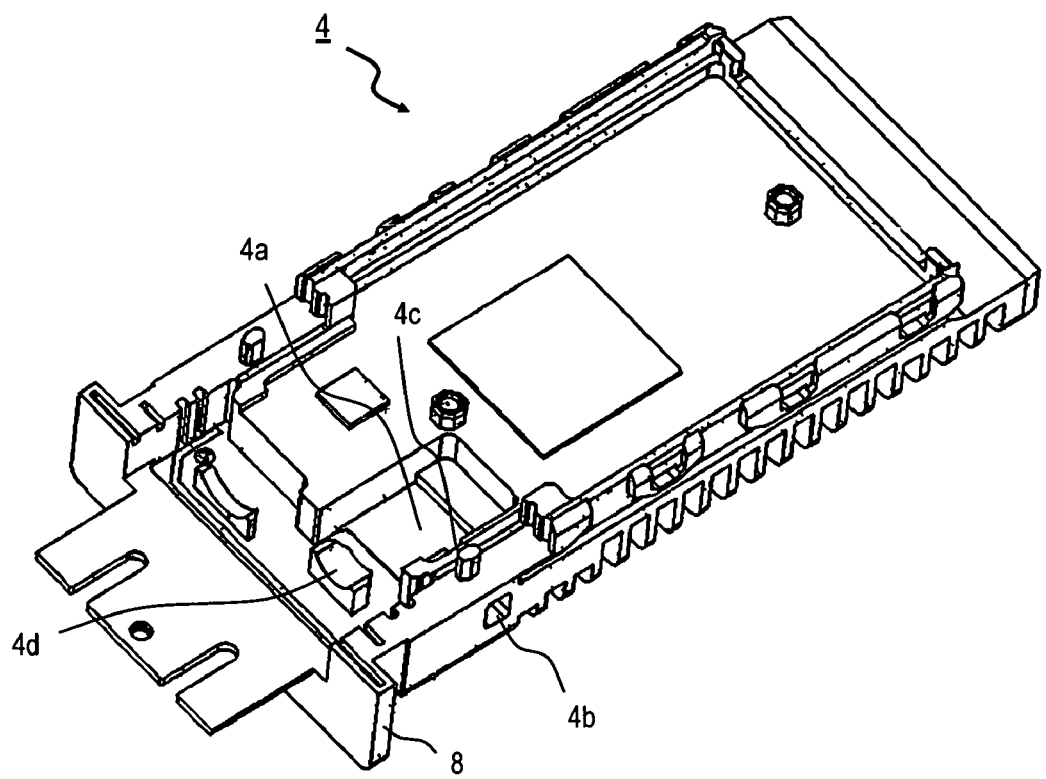
FIG. 7A is a perspective view showing the upper housing of the prenset optical transceiver.
Figure 7B:
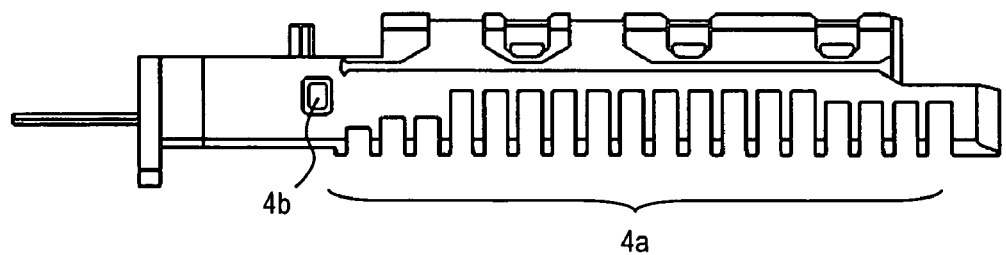
FIG. 7B is a side view of the upper housing.

FIG. 7A illustrates the upper housing 4 that installs the EA-DFB module 10 and FIG. 7B is the side view of the upper housing 4. The EA-DFB module 10 is mounted on the hollow 4a, the mounting portion, in the upper housing 4. The front side of the mounting portion 4a forms a saddle 4d to mount the sleeve 11a thereof. Innner side surface of the housing 4 forms a groove 4c into which the projections 50d in the outside of the side portion 50b of the support member 50 is set. In a halfway of the groove 4c is formed with an screw hole 4b reaching the outer surface of the housing 4. When the support member 50 is installed, the projections in the outer side 50b are fit into this groove 4c and the screw hole 50e of the side portion 50b follows the screw hole 4b of the housing 4. By fittin the projections 50d into th egroove 4c and driving the screw inserted into the hole 4b from the outside of the housing 4 to make the supper member 50 in contact to the inner surface of the housing, the position of the support member 50 may be automatically defined in drections parallel to the primary surface of the housing 4.

Thus, altough the present optical transceiver 1 rigidly fixes the sleeve 11a to the upper housing 4, the relative postion of the module 10 with respect to the housing 4 in direction parallel to the primary sufeace of the upper housing 4 is left free to enable the module to optionally align with the housing 4. While, for the up-and-down direction, the screw hole 4b formed in the side wall of the housing 4 has an elongate shape to enable the module to absorb a gap in the up-and-down direction by adjsuting the position of the screw in the hole 4c. That is, even the sleeve 11a is rigidly foxed against the upper housing 4, the mechanical stress can not occur at the portion the sleeve portion 11 is attached to the box portion 12.

Moreover, not only the thermal grease is filled between the ceiling 12b and the upper portion 50c of the support member 50 but also the elastic member is inserted between bottom of the box portion 12 and the bottom portion of the support member 50 to press the module 10 against the upper portion 50c. In addition, the side portion 50b of the support member 50 is rigidly adhered to the side wall of the housing 4 by the screw 4e. Accordingly, the box portion 12 may be thermally coupled with the upper housing 4 to conduct heat generated within the box portion 12 to the housing 4 via the support membet 50.

Figure 8A:
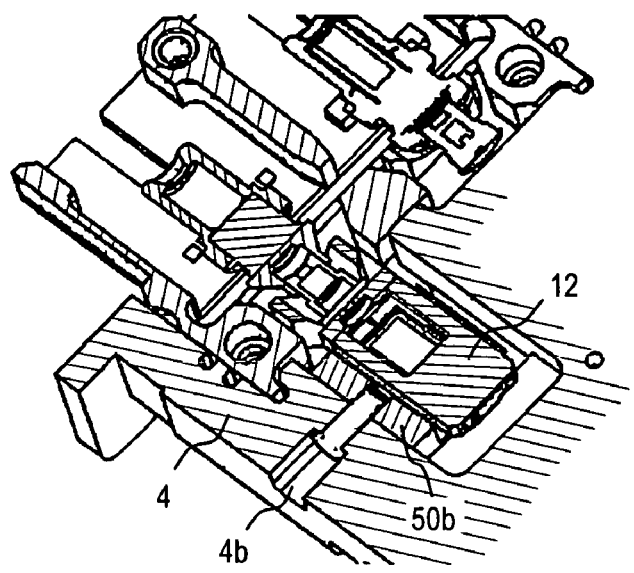
FIG. 8A is a perspective view showint the optical module with the support member is installed in the housing.
Figure 8B:
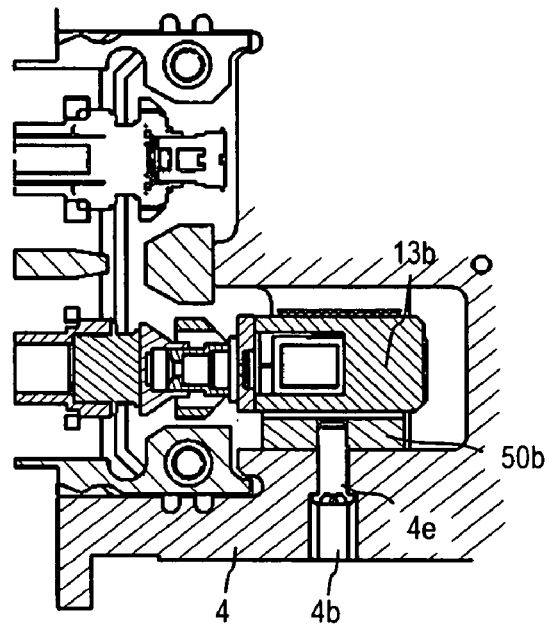
FIG. 8B is a plan view.
Figure 8C:
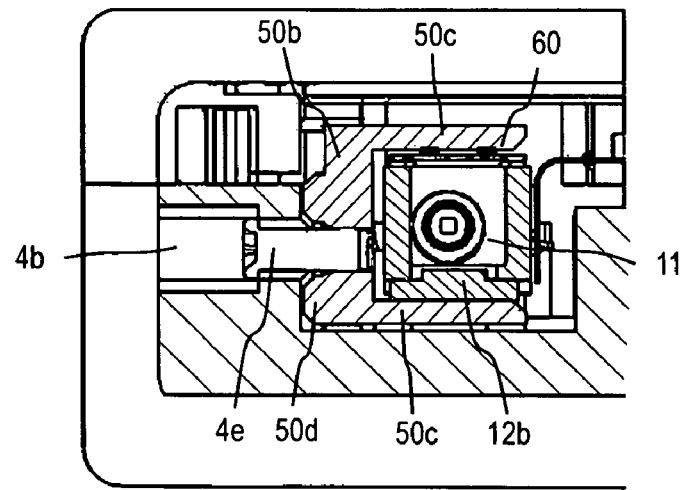
FIG. 8C is a front view of the module with the support member.

FIGS. from 8A to 8C illustrate the module 10 installed and adhered to the inside of the housing 4. FIG. 8A is a perspective view, FIG. 8B is a plan view, and FIG. 8C is a front view.

The module 10 is installed in the upper housing 4 such that the saddle 4d mounts the root of the sleeve portion 11, the portion closest to the box portion 12. The halfway 11c of the sleeve portion 11 is not only fixed but positioned against the housing 4 by the latch bar 5b. For the box portion, the housing 4 only fixes the support member 50 to leave the box portion flexible in the position thereof. Between the side 12h of the box portion 12 and the side portion 50b of the support member 50 is formed with a space to adjust the position of the box portion 12 in the plane parallel to the primary surface of the housing 4. While, the ceiling 12b of the box portion 12 is adhered to the top portion 50c of the support member 50 with the thermal grease therebetween, and the bottom of the box portion 12 puts the elastic member 60 between the bottom portion 50a of the support member 50 to press the module 10 against the top portion 50c.

Thus, the box portion 12 may be flexible in the position parallel to the primary surface of the housing 4 when the support member 50 is fixed with the screw 4e to the housing 4 or the sleeve portion 11 is fixed to housing 4. Moreover, the screw hole 4b provided in the side wall of the housing 4 has the elongate shape in the up-and-down direction. Therefore, the support member 50 may be flexible in the up-and-down position thereof by this elongate shape, which solves the prblem occurred in the conventional module that the mechanicall stress may be induced at the point the sleeve portion 11 extrudes from the box portion 12 by the fixing of both the sleeve portion 11 and the box portion 12 to the housing 4.

It will become apparent to those skilled in the art that various modifications to the preferred embodiment of the invention as described herein can be made without departing from the spirit or scope of the invention as defined by the appended claims.

What is claimed is:

1. An optical transceiver, comprising:
an optical transmitting module including a sleeve portion and a box portion, the sleeve portion being optically coupled with an optical fiber and the box portion housing a light emitting device therein;
a support member for supporting the box portion of the optical transmitting module; and
a housing for enclosing the optical transmitting module and the support member therein, the housing having a primary surface for installing the optical transmitting module thereon, the housing adjustably fixing the support member along a direction substantially perpendicular to the primary surface,
wherein the sleeve portion of the optical transmitting module is rigidly fixed to the housing and the box portion is flexibly fixed to the housing through the support member.

2. The optical transceiver according to claim 1,
wherein the support member is fixed to the housing with a screw, and the housing provides a screw hole for mating with the screw, the screw hole being elongated along a direction substantially perpendicular to the primary surface of the housing.

3. The optical transceiver according to claim 1,
wherein the optical transmitting module is supported by the supporting member and is adjustable along directions parallel to the primary surface of the housing.

4. The optical transceiver according to claim 3,
wherein the optical transmitting module is supported by the supporting member with a thermal grease filled between the optical transmitting module and the supporting member.

5. The optical transceiver according to claim 4,
wherein the supporting member has top, bottom, and side portions. the side portion connecting the top and bottom portions, the top and bottom portions extending in parallel to the primary surface of the housing and placing the optical transmitting module therebetween, and
wherein the optical transceiver further provides a elastic member located between one of top and bottom portions of the supporting member and the optical transmitting module to press the optical transmitting module against the other of top and bottom portions.

6. The optical transceiver according to claim 1, wherein the support member is made of aluminum (Al).

7. The optical transceiver according to claim 1, wherein the housing is made of metal.

8. The optical transceiver according to claim 1,
wherein the optical transmitting module includes a distributed feedback laser diode, an optical modulator, and a thermo-electric controller, the distributed feedback laser diode emitting light in direct current mode, the optical modulator having an electro-absorption type, the thermo-electric controller controlling a temperature of the distributed feedback laser diode.

9. The optical transceiver according to claim 8,
wherein the thermo-electric controller is mounted on a side of the optical transmitting module and the side of the optical transmitting module is adhered to the support member through a thermal grease.

10. An optical transceiver, comprising:
an optical transmitting module including a sleeve portion and a box portion, the sleeve portion being optically coupled with an optical fiber and the box portion housing a light emitting device therein;
a support member for supporting the optical transmitting module, the support member having top, bottom and side portions, the side portion connecting the top and bottom portions, the top and bottom portions sandwiching the box portion of the optical transmitting module therebetween,
an elastic member put between one of top and bottom portions of the supporting member and the optical transmitting module, the elastic member pushing the optical transmitting module against the other of the top and bottom portions of the support member; and
a housing for enclosing the optical transmitting module and the support member therein, the housing having a primary surface for installing the optical transmitting module thereon through the support member, the top and bottom portions of the support member extending substantially in parallel to the primary surface of the housing, wherein the sleeve portion of the optical transmitting module is rigidly fixed to the housing and the box portion is flexibly fixed to the housing through the support member.

11. An optical transceiver, comprising:

an optical transmitting module including a sleeve portion and a box portion, the sleeve portion being optically coupled with an optical fiber and the box portion housing a light emitting device therein;

a support member having top, bottom and side portions, the side portion connecting the top and bottom portions; and a housing for enclosing the optical transmitting module and the support member therein, the housing having a primary surface for installing the optical transmitting module thereon through the support member, wherein the box portion is adjustably supported between the top and bottom portions of the support member along a direction substantially perpendicular to the primary surface and along directions substantially in parallel to the primary surface of the housing.

12. The optical transceiver according to claim 11, wherein a gap between the supporting member and the optical transmitting module is filled with a thermal grease.

13. The optical transceiver according to claim 11, wherein the optical transceiver further provides an elastic member put between one of top and bottom potions of the supporting member and the optical transmitting module so as to push the optical transmitting module against the other of top and bottom portions.

* * * * *